R. NEALE.
Velocipede.
No. 98,092. Patented Dec. 21, 1869.
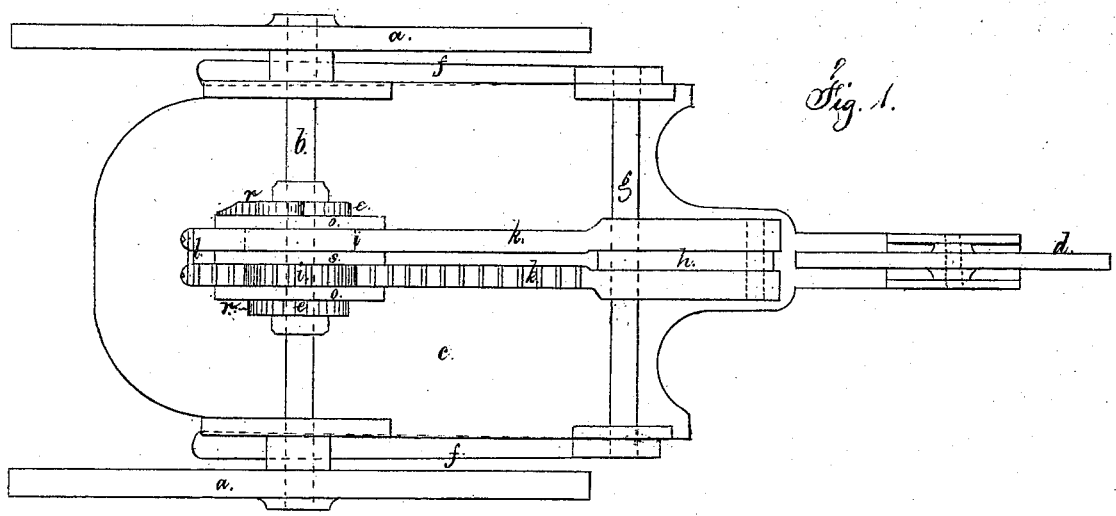
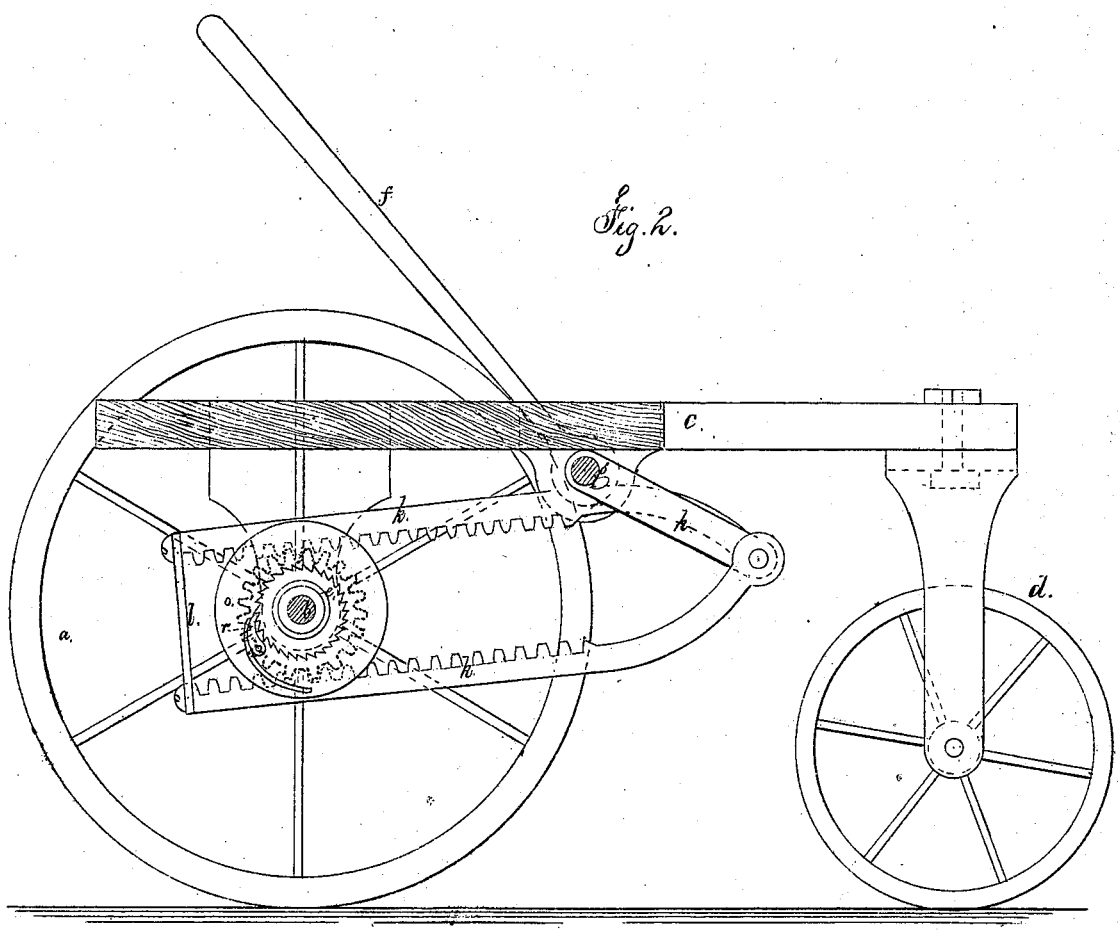

United States Patent Office.

ROBERT NEALE, OF BROOKLYN, E. D. NEW YORK.

Letters Patent No. 98,092, dated December 21, 1869; antedated December 4, 1869.

IMPROVEMENT IN VELOCIPEDES.

The Schedule referred to in these Letters Patent and making part of the same.

*To all whom it may concern:*

Be it known that I, ROBERT NEALE, of Brooklyn, E. D., in the county of Kings, and State of New York, have invented and made a new and useful Improvement in Velocipedes; and I do hereby declare the following to be a full, clear, and exact description of the same, reference being had to the annexed drawing, making part of this specification, wherein—

Figure 1 is an inverted plan of said velocipede, and

Figure 2 is a vertical section of the said velocipede longitudinally.

Similar marks of reference denote the same parts.

Velocipedes have heretofore been driven by a lever and segmental rack, acting upon a pinion on the front wheels. This is not applicable to the back wheels, and, in consequence of the concussion, the rack and pinion-teeth are liable to separate, and not remain properly in gear with each other.

My invention consists in a pair of racks, jointed to a lever, and combined with a pair of pinions and ratchet-wheels, in such a manner that the racks are moved freely endwise by the lever, and the teeth remain properly in gear; but first one pinion, and then the other gives motion to the axle of the wheel or wheels.

By this mechanism, the lever can be worked with a greater or less stroke, and will be operative; and when going down hill, or when the necessary momentum has been attained, the ratchets and pawls allow the movement to continue without being checked by the racks and pinions.

In the drawing—

$a\ a$ are the hind wheels on the axle $b$;

$c$ is the frame and seat of the velocipede; and $d$ is the front or steering-wheel.

These parts may be of any desired size or character.

Upon the axle $b$, the two ratchet-wheels $e\ e$ are permanently fastened, and between them are the pinions $i\ i$, with flanges $o\ o$ attached to the respective pinions; and $r\ r$ are pawls on $o$, taking $e$.

$s$ is a loose disk between the pinions $i\ i$.

$f$ is a lever on a shaft or fulcrum $g$, and $h$ is a joint, by which the rack-bars $k\ k$ are united.

This lever $f$ may be of any desired character, and the rack-bars $k\ k$ are so placed as to be the proper distance apart to gear into and run one on one side of one pinion $i$, and the other on the opposite side of the other pinion, and be guided by the flanges $o$ and disk $s$, and a connection, $l$, keeps the far end of the racks at the proper distance apart.

It will be evident, that when the lever is moved back and forth, the power is communicated, to rotate the axle, through the racks, and first one pinion, and then the other, the pawls and ratchet-wheels allowing of the return-movements.

This mechanism, although especially adapted to a velocipede, might be applied to giving a rotary movement to other devices.

What I claim, and desire to secure by Letters Patent, is—

The pinions $i\ i$, guide-flanges $o\ o$, and disk $s$, in combination with the ratchet-wheels $e$, pawls $r$, and racks $k$, united to the lever $f$ by a joint, so that the movement of the lever $f$ gives a rotary motion to the shaft or axle $b$, in the manner specified.

In witness whereof, I have hereunto set my signature, this 15th day of April, A. D. 1869.

ROBERT NEALE.

Witnesses:
CHAS. H. SMITH,
GEO. T. PINCKNEY.